J. B. INGRAM.
FRUIT SNOWFLAKER.
APPLICATION FILED APR. 11, 1921.

1,414,953.

Patented May 2, 1922.
2 SHEETS—SHEET 1.

Inventor
John B. Ingram
By Hazard & Miller
Atty.

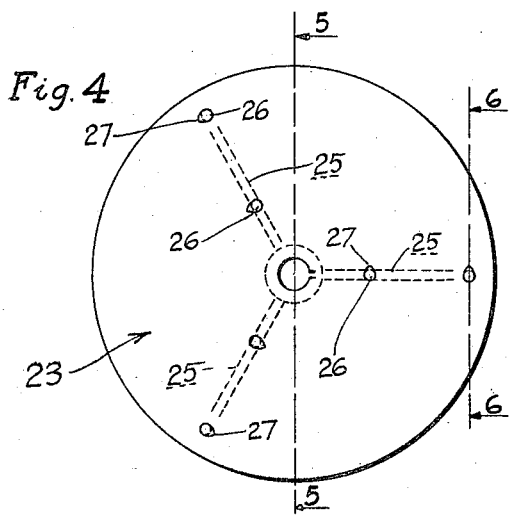
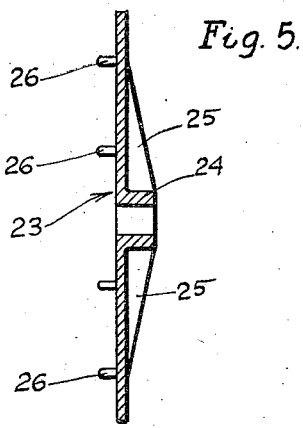
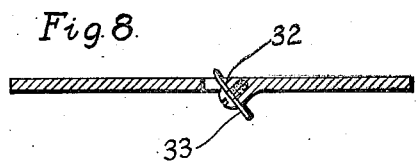
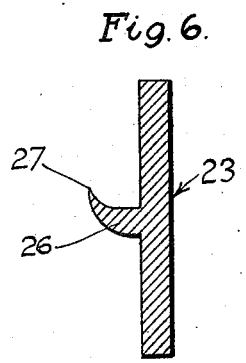
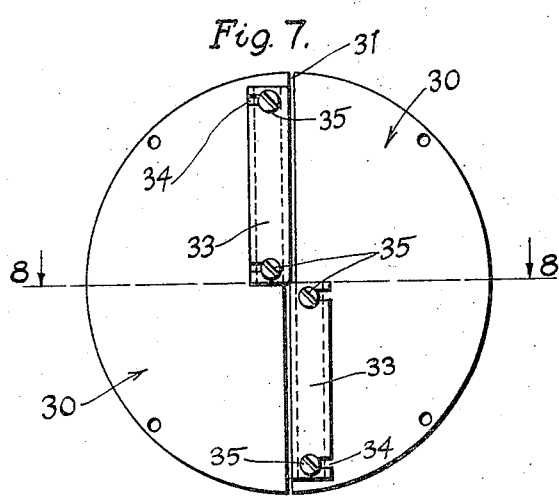

UNITED STATES PATENT OFFICE.

JOHN B. INGRAM, OF LOS ANGELES, CALIFORNIA.

FRUIT SNOWFLAKER.

1,414,953.      Specification of Letters Patent.      Patented May 2, 1922.

Application filed April 11, 1921. Serial No. 460,212.

*To all whom it may concern:*

Be it known that I, JOHN B. INGRAM, a citizen of the United States, residing at Los Angeles, in the county of Los Angeles and State of California, have invented new and useful Improvements in Fruit Snowflakers, of which the following is a specification.

It is the object of this invention to provide a machine for flaking or shaving ice so as to adapt the same to be impregnated with fruit juices and the like, for forming so-called "fruit snow."

The machine includes a container for a cake of ice and shaving blades at one end thereof, with a rotatable member engaging the cake of ice and forcing the same against said blade while rotating the cake in order to flake or shave the ice.

The improved construction provides an efficient arrangement of the shaving blades, including means for adjusting said blades, and also affords a positive means for engaging the cake of ice by the rotatable member. The invention further contemplates the provision of an efficient power drive for the rotatable ice engaging member, and also utilizes an efficient manually operated controlling means for forcing the rotating cake of ice against the shaving blades.

The invention will be readily understood from the following description of the accompanying drawings, in which:

Fig. 4 is a plan view of the rotatable ice engaging head, looking in the direction of the arrow shown in Fig. 2.

Figure 1:
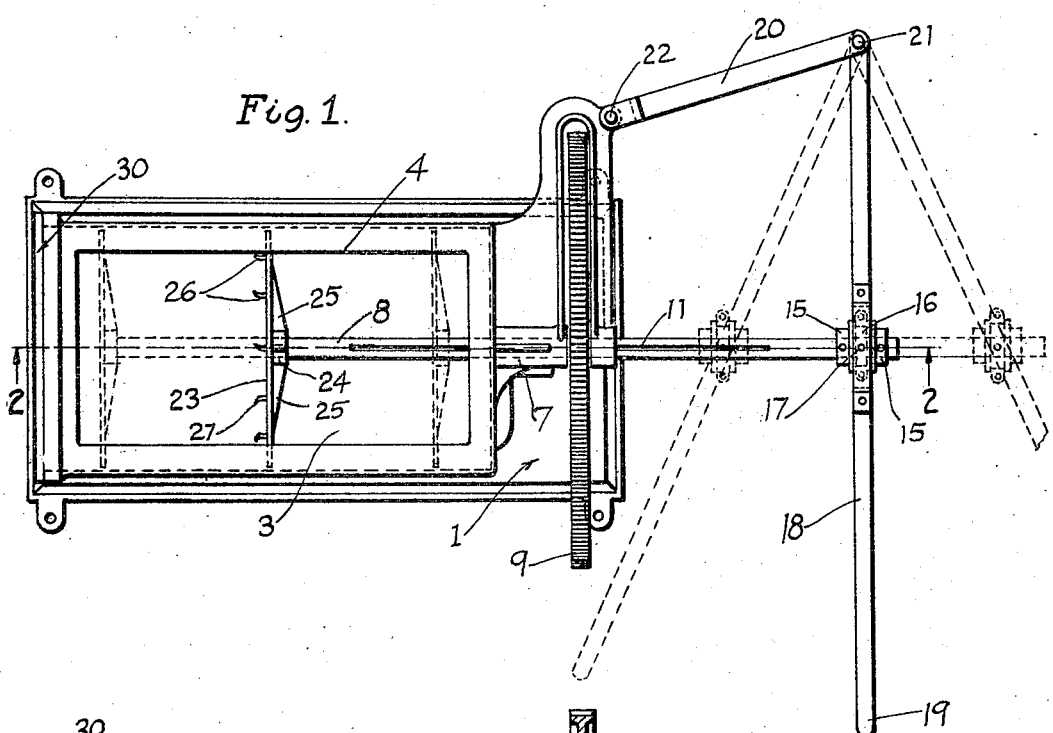
Figure 1 is a plan view of the device constructed in accordance with the invention.
Figure 2:
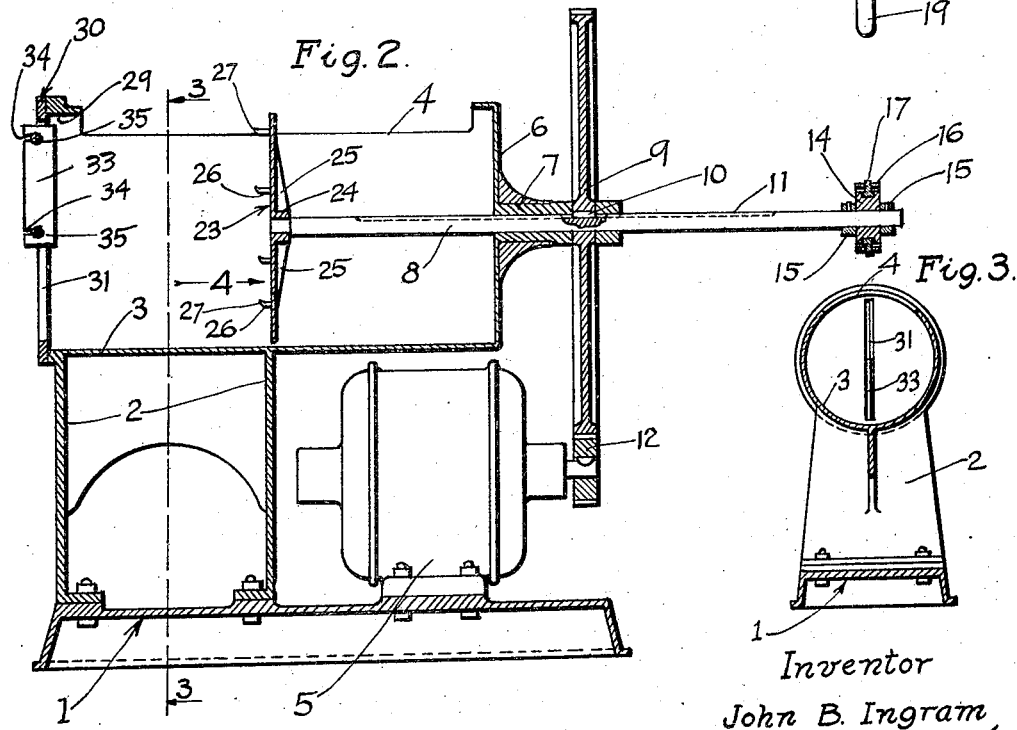
Fig. 2 is a longitudinal section on the line 2—2 of Fig. 1.
Figure 3:
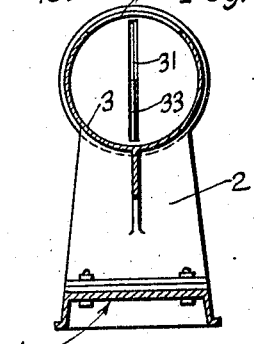
Fig. 3 is a transverse section on the line 3—3 of Fig. 2.

Figs. 5 and 6 are detail sections on the lines 5—5 and 6—6 of Fig. 4.

Fig. 7 is a plan view of the head carrying the ice shaving blades.

Fig. 8 is a transverse section on the line 8—8 of Fig. 7.

The improved apparatus includes a base 1 having the supporting upright 2 carrying the trough 3 which is preferably circular in transverse section and which is provided with an open upper side 4. The base 1 also supports a suitable driving means for the apparatus which is shown as a usual electric motor 5.

Trough 3 is closed at one end as shown at 6, and a bearing 7 is formed at said end closure cap which is adapted to receive a shaft 8 projecting into the trough and also extending outwardly beyond the end of the same. A gear wheel 9 is journaled in the bearing 7 and forms a driving connection for shaft 8 while permitting of longitudinal movement thereof. For this purpose, a key 10 at the hub of the gear wheel, is received in a keyway 11 formed along the length of shaft 8. The gear wheel 9 may be driven by a pinion 12 upon the shaft of motor 5.

The construction as just described provides for rotation of shaft 8 by the motor 5 and at the same time, the shaft is adapted to be longitudinally reciprocated by manual means. For this purpose, a collar 14 is journaled upon the projecting end of shaft 8 and is held against longitudinal movement thereon by means of set collars 15 fixed to the shaft at the respective faces of collar 14. The arms 16 of a yoke are fixed to collar 14 by a set screw 17 and said yoke arms are secured to a lever 18 extending transversely of shaft 8. One end of this lever forms a handle 19 while its opposite end is pivoted to a link 20 as shown at 21. The opposite end of this link is suitably pivoted as shown at 22, to the frame of the apparatus. By this arrangement it will be seen, that swinging handle 19 back and forth to the positions as shown in dotted lines in Fig. 1 will cause reciprocation of shaft 8 while permitting the latter to be rotated through its driving connection.

In operation, a cake of ice is placed in trough 3, and shaft 8 is provided with a head engaging the cake of ice so as to rotate the same with the shaft while permitting of forcing of said cake of ice toward the opposite end of the trough. The head for shaft 8 is shown as a disc 23 having a hub 24 attached to the end of shaft 8. The rear surface of the disc is preferably provided with radial strengthening flanges 25, and the front surface of the disc, which is a plane surface, is provided with projecting prongs 26 provided with curved ends 27, so as to engage a cake of ice and thereby cause rotation of the same with the disc and shaft 8.

The end of trough 3 towards which the rotating cake of ice is forced, is open as shown at 29, and a closure cap carrying the shaving blades, is adapted to be mounted on this open end of the trough. The cap preferably includes, two semi-circular plates adapted to be bolted to the end of the trough so as to form a diametrical slot 31 between the same. At the respective ends of this slot, the edges of the respective plates 30 are inclined as shown at 32 so as to support blades 33 extending through said slot from the respective plates. In order that the projection of the shaving edges of said blades through said slot may be adjusted, the blades are preferably provided with slots 34 adapted to be engaged by set screws 35 threaded into the plates 30. By this arrangement, it will be seen that rotation of the cake of ice, while forcing the same against the cutting edges of blade 32, will cause shaving or flaking of said ice and the consequent discharge of said flakes through the slot 31 so that they may be collected in a suitable container.

It will be noted that the construction as just described provides for the positive engagement of a cake of ice so as to cause rotation thereof while forcing the same against the shaving means in order that the cake of ice may be suitably flaked for the purpose set forth.

Various changes may be made without departing from the spirit of the invention as claimed.

What is claimed is:

In a machine of the class described, a container, an elongated bearing formed on one end thereof, a horizontally disposed U-shaped bracket projecting laterally from said bearing, a shaft arranged for sliding movement through said bearing, a portion of which shaft projects into the container, a gear wheel arranged between the legs of said U-shaped bracket and having a slot-and-key connection with said shaft, means for driving said gear wheel, manually operated means for moving said shaft lengthwise through said bearing, a disk carried by the end of the shaft within said container, and an inclined blade adjustably arranged in the end of the container opposite to the end that is provided with the bearing.

In testimony whereof I have signed my name to this specification.

JOHN B. INGRAM.